US012568549B2

(12) United States Patent
Lin et al.

(10) Patent No.: US 12,568,549 B2
(45) Date of Patent: Mar. 3, 2026

(54) MA PDU REACTIVATION REQUESTED HANDLING

(71) Applicant: MEDIATEK INC., Hsin-Chu (TW)

(72) Inventors: Yuan-Chieh Lin, Hsin-Chu (TW); Chien-Chun Huang-Fu, Hsin-Chu (TW)

(73) Assignee: MediaTek Inc., Hsinchu City (TW)

( * ) Notice: Subject to any disclaimer, the term of this patent is extended or adjusted under 35 U.S.C. 154(b) by 323 days.

(21) Appl. No.: 17/704,580

(22) Filed: Mar. 25, 2022

(65) Prior Publication Data

US 2022/0353941 A1 Nov. 3, 2022

Related U.S. Application Data

(60) Provisional application No. 63/181,363, filed on Apr. 29, 2021.

(51) Int. Cl.
*H04W 76/25* (2018.01)
*H04W 76/15* (2018.01)

(52) U.S. Cl.
CPC ........... *H04W 76/25* (2018.02); *H04W 76/15* (2018.02)

(58) Field of Classification Search
CPC ..... H04W 48/08; H04W 48/18; H04W 76/11; H04W 76/15; H04W 76/16; H04W 76/19; H04W 76/25
See application file for complete search history.

(56) References Cited

U.S. PATENT DOCUMENTS

| | | | | |
|---|---|---|---|---|
| 10,750,406 B2 * | 8/2020 | Lai | .................. | H04W 28/0925 |
| 10,785,820 B2 * | 9/2020 | Salkintzis | ............. | H04W 76/12 |

(Continued)

FOREIGN PATENT DOCUMENTS

| | | | | | |
|---|---|---|---|---|---|
| CN | 110583035 A | * | 12/2019 | ......... | H04L 47/2441 |
| CN | 111034336 A | * | 4/2020 | ............ | H04W 48/18 |

(Continued)

OTHER PUBLICATIONS

3rd Generation Partnership Project (3GPP) Technical Specification (TS) 24.501, Technical Specification Group Core Network and Terminals: Non-Access-Stratum (NAS) protocol for 5G System (5GS), Apr. 2021, Release 17, Version 17.2.1 (Year: 2021).*

(Continued)

*Primary Examiner* — Eric Nowlin
(74) *Attorney, Agent, or Firm* — Helen Mao; Zheng Jin; Imperium Patent Works

(57) ABSTRACT

A method for handling a reactivation request from the network for an MA PDU session with session and service continuity (SSC) mode 3 is proposed. When UE receives a PDU SESSION MODIFICATION COMMAND message which includes 5GSM cause #39 "reactivation requested" for an existing MA PDU session, UE handles the network-requested PDU session modification procedure, and UE re-initiates the UE-requested PDU session establishment procedure with a new MA PDU session ID. UE determines how to proceed with a PDU session reestablishment procedure for the new MA PDU session based on different scenarios of UE registration and user plane resources of the existing MA PDU session, and/or also based on whether the PDU SESSION MODIFICATION COMMAND message is sent over 3GPP access type or non-3GPP access type.

20 Claims, 5 Drawing Sheets

(56) References Cited

U.S. PATENT DOCUMENTS

| | | | | |
|---|---|---|---|---|
| 10,841,857 B2 * | 11/2020 | Salkintzis | .............. | H04L 45/30 |
| 10,869,245 B2 * | 12/2020 | Huang-Fu | .......... | H04W 36/144 |
| 10,911,991 B2 * | 2/2021 | Kawasaki | .............. | H04W 8/08 |
| 11,064,388 B2 * | 7/2021 | Kim | ..................... | H04M 15/66 |
| 11,160,136 B2 * | 10/2021 | Kawasaki | ............ | H04W 76/20 |
| 11,172,528 B2 * | 11/2021 | Chiba | ................... | H04W 80/04 |
| 11,178,717 B2 * | 11/2021 | Ha | ........................ | H04W 76/15 |
| 11,184,800 B2 * | 11/2021 | Kim | ....................... | H04L 45/24 |
| 11,483,754 B2 * | 10/2022 | Lai | ...................... | H04W 76/16 |
| 11,528,763 B2 * | 12/2022 | Youn | ..................... | H04W 76/30 |
| 11,564,132 B2 * | 1/2023 | Suh | ....................... | H04W 24/02 |
| 11,576,043 B2 * | 2/2023 | Kim | ..................... | H04W 76/10 |
| 11,627,622 B2 * | 4/2023 | Kumar | .............. | H04L 65/1069 |
| | | | | 370/329 |
| 11,632,696 B2 * | 4/2023 | Wang | ............... | H04W 36/0027 |
| | | | | 370/331 |
| 11,722,534 B2 * | 8/2023 | Karampatsis | ....... | H04L 65/1104 |
| | | | | 709/227 |
| 11,950,198 B2 * | 4/2024 | Wang | ................. | H04W 60/005 |
| 2019/0230722 A1 * | 7/2019 | Kawasaki | ............ | H04W 76/10 |
| 2019/0261449 A1 * | 8/2019 | Kim | .................... | H04L 65/1046 |
| 2019/0274178 A1 * | 9/2019 | Salkintzis | ......... | H04W 28/0268 |
| 2019/0281508 A1 * | 9/2019 | Kawasaki | ............ | H04W 76/20 |
| 2019/0297669 A1 * | 9/2019 | Kawasaki | ............... | H04L 65/40 |
| 2019/0306752 A1 * | 10/2019 | Lai | .................... | H04W 28/0925 |
| 2019/0313290 A1 * | 10/2019 | Huang-Fu | ............. | H04W 24/02 |
| 2019/0357082 A1 * | 11/2019 | Kim | ........................ | H04L 12/14 |
| 2019/0357294 A1 * | 11/2019 | Ha | ........................ | H04W 76/15 |
| 2020/0015137 A1 * | 1/2020 | Stojanovski | .......... | H04W 76/15 |
| 2020/0092790 A1 * | 3/2020 | Salkintzis | ............ | H04W 76/10 |
| 2020/0128461 A1 * | 4/2020 | Li | ..................... | H04W 36/0033 |
| 2020/0178196 A1 * | 6/2020 | Wang | .................... | H04W 48/18 |
| 2020/0229035 A1 * | 7/2020 | Kim | ........................ | H04W 8/08 |
| 2020/0389931 A1 * | 12/2020 | Kumar | ............... | H04L 65/1073 |
| 2021/0014742 A1 * | 1/2021 | Wang | .............. | H04W 36/0027 |
| 2021/0022203 A1 * | 1/2021 | Kang | ..................... | H04W 8/08 |
| 2021/0037585 A1 * | 2/2021 | Youn | .................... | H04W 60/06 |
| 2021/0092664 A1 * | 3/2021 | Lai | ...................... | H04W 8/08 |
| 2021/0100047 A1 * | 4/2021 | Chiba | .................. | H04W 76/22 |
| 2021/0105858 A1 * | 4/2021 | Huang-Fu | ............. | H04W 76/15 |
| 2021/0152615 A1 * | 5/2021 | Karampatsis | ....... | H04L 65/1016 |
| 2021/0227596 A1 | 7/2021 | Aramoto et al. | | |
| 2021/0289403 A1 * | 9/2021 | Suh | ..................... | H04W 36/125 |
| 2021/0321304 A1 * | 10/2021 | Karampatsis | ..... | H04W 36/0011 |
| 2021/0410010 A1 * | 12/2021 | Salkintzis | ............. | H04W 76/15 |
| 2022/0022103 A1 * | 1/2022 | Prakasam | ............ | H04W 60/00 |
| 2022/0060948 A1 * | 2/2022 | Harsha | .............. | H04W 28/0268 |
| 2022/0132454 A1 | 4/2022 | Youn et al. | | |
| 2022/0279384 A1 * | 9/2022 | Sugawara | ............ | H04W 48/18 |
| 2023/0070882 A1 * | 3/2023 | Youn | .................... | H04W 28/02 |
| 2023/0084094 A1 * | 3/2023 | Youn | .................... | H04W 76/20 |
| | | | | 370/331 |
| 2023/0099649 A1 * | 3/2023 | Alonso | ................ | H04M 15/88 |
| | | | | 455/406 |
| 2023/0102655 A1 * | 3/2023 | Wang | ................... | H04W 76/15 |
| | | | | 370/329 |
| 2023/0132058 A1 * | 4/2023 | Youn | ...................... | H04L 12/14 |
| | | | | 370/329 |
| 2023/0319621 A1 * | 10/2023 | Gan | ..................... | H04L 65/1069 |
| | | | | 370/229 |
| 2024/0064863 A1 * | 2/2024 | Dauneria | .............. | H04W 76/32 |
| 2024/0147325 A1 * | 5/2024 | He | ....................... | H04W 36/023 |
| 2024/0205861 A1 * | 6/2024 | Wang | ..................... | H04W 76/16 |
| 2025/0056359 A1 * | 2/2025 | Wang | ..................... | H04L 5/0053 |
| 2025/0274348 A1 * | 8/2025 | Sung | ..................... | H04W 84/10 |

FOREIGN PATENT DOCUMENTS

| | | | | | |
|---|---|---|---|---|---|
| CN | 111328460 A | | 6/2020 | | |
| CN | 111418256 A | | 7/2020 | | |
| CN | 112314043 A | | 2/2021 | | |
| CN | 112637963 A | | 4/2021 | | |
| CN | 110583035 B | * | 4/2022 | ........ | H04L 47/2441 |
| CN | 113950106 B | * | 7/2023 | ........ | H04W 36/0027 |
| CN | 111034336 B | * | 4/2024 | ........... | H04W 48/18 |
| CN | 118433934 A | * | 8/2024 | ........... | H04W 48/18 |
| EP | 3755116 A1 | * | 12/2020 | ........... | H04W 48/16 |
| EP | 3883297 A1 | * | 9/2021 | ........... | H04W 24/02 |
| EP | 4171123 A1 | * | 4/2023 | ........... | H04W 76/15 |
| EP | 3837888 B1 | * | 7/2023 | ........... | H04W 36/14 |
| EP | 3755116 B1 | * | 7/2024 | ........... | H04W 48/16 |
| EP | 4510765 A2 | * | 2/2025 | ........... | H04W 24/02 |
| IL | 272552 A | * | 3/2020 | ........... | H04W 48/18 |
| IL | 298699 A | * | 2/2023 | ........... | H04W 48/18 |
| JP | 2020530690 A | * | 10/2020 | | |
| JP | 6959695 B2 | * | 11/2021 | ........... | H04W 48/18 |
| JP | 2022002412 A | * | 1/2022 | ........... | H04W 48/18 |
| JP | 2023517655 A | * | 4/2023 | | |
| JP | 2023178979 A | * | 12/2023 | ........... | H04W 48/18 |
| JP | 7442484 B2 | * | 3/2024 | ........... | H04W 48/18 |
| JP | 7564313 B2 | * | 10/2024 | ........... | H04W 48/18 |
| KR | 20200049760 A | * | 5/2020 | | |
| KR | 102373068 B1 | * | 3/2022 | | |
| KR | 20220035977 A | * | 3/2022 | | |
| KR | 20240015745 A | * | 2/2024 | | |
| TW | I715959 B | * | 1/2021 | | |
| WO | WO-2019032972 A1 | * | 2/2019 | ........... | H04W 48/18 |
| WO | WO-2019032972 A8 | * | 3/2019 | ........... | H04W 48/18 |
| WO | WO-2019160278 A1 | * | 8/2019 | ........... | H04W 48/16 |
| WO | 2020020428 A1 | | 1/2020 | | |
| WO | 2020184956 A1 | | 9/2020 | | |
| WO | WO-2021182911 A1 | * | 9/2021 | ........... | H04W 24/02 |
| WO | WO-2023147152 A1 | * | 8/2023 | ........... | H04W 24/10 |
| WO | WO-2025008895 A1 | * | 1/2025 | ........... | H04W 76/11 |

OTHER PUBLICATIONS

Taiwan IPO, office action for the Taiwanese patent application 111115803 (no English translation is available), dated Dec. 9, 2022 (13 pages).

3GPP TS 24.501 V17.2.1 Technical Specification Group Core Network and Terminals; Non-Access-Stratum (NAS) protocol for 5G System (5GS).

* cited by examiner

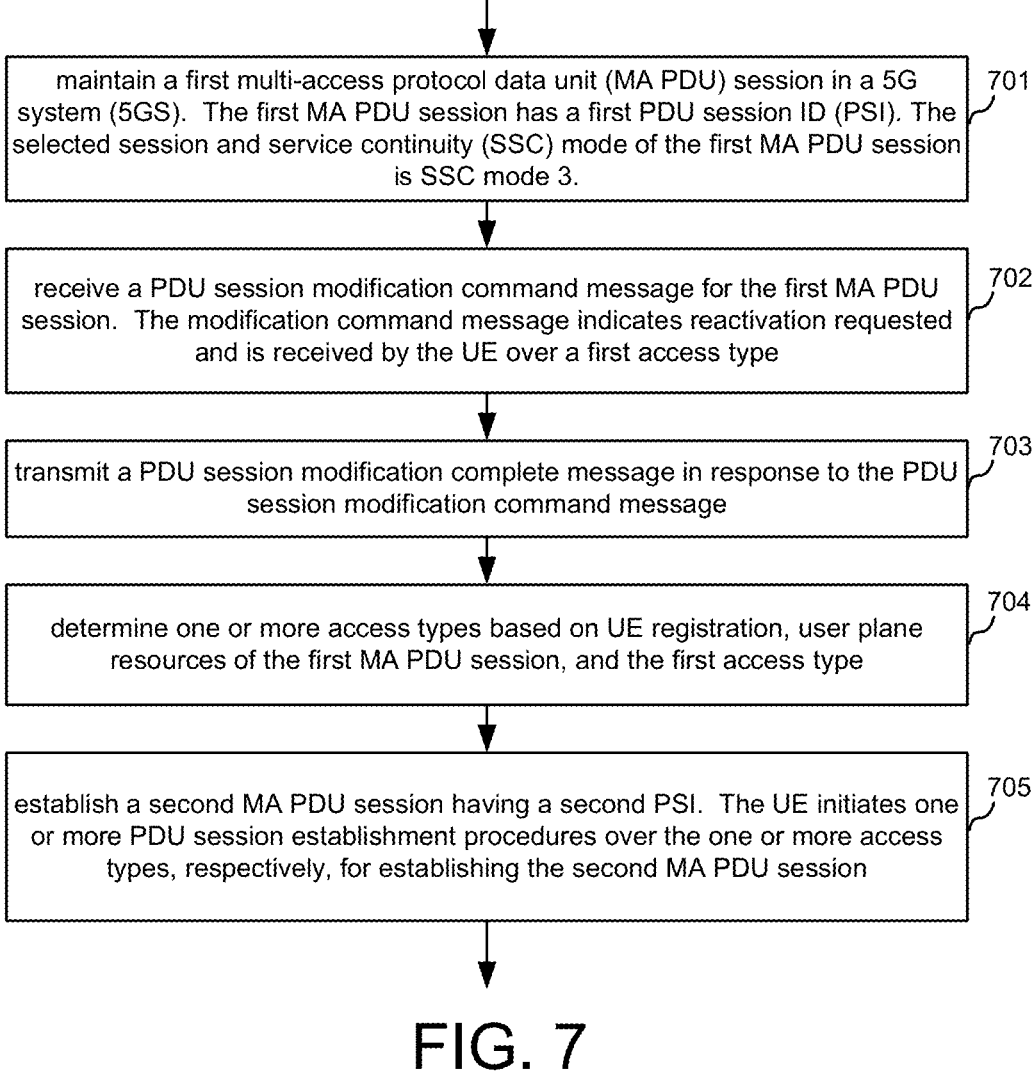

maintain a first multi-access protocol data unit (MA PDU) session in a 5G system (5GS). The first MA PDU session has a first PDU session ID (PSI). The selected session and service continuity (SSC) mode of the first MA PDU session is SSC mode 3.          701 receive a PDU session modification command message for the first MA PDU session. The modification command message indicates reactivation requested and is received by the UE over a first access type          702 transmit a PDU session modification complete message in response to the PDU session modification command message          703 determine one or more access types based on UE registration, user plane resources of the first MA PDU session, and the first access type          704 establish a second MA PDU session having a second PSI. The UE initiates one or more PDU session establishment procedures over the one or more access types, respectively, for establishing the second MA PDU session          705

FIG. 7

MA PDU REACTIVATION REQUESTED HANDLING

CROSS REFERENCE TO RELATED APPLICATIONS

This application claims priority under 35 U.S.C. § 119 from U.S. Provisional Application No. 63/181,363, entitled "MA PDU Reactivation Requested Handling", filed on Apr. 29, 2021, the subject matter of which is incorporated herein by reference.

TECHNICAL FIELD

The disclosed embodiments relate generally to wireless communication, and, more particularly, to method for multi-access (MA) PDU session reactivation requested handling.

BACKGROUND

The wireless communications network has grown exponentially over the years. A long-term evolution (LTE) system offers high peak data rates, low latency, improved system capacity, and low operating cost resulting from simplified network architecture. LTE systems, also known as the 4G system, also provide seamless integration to older wireless network, such as GSM, CDMA and universal mobile telecommunication system (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. The next generation mobile network (NGMN) board, has decided to focus the future NGMN activities on defining the end-to-end requirements for 5G new radio (NR) systems.

In 5G/NR, a protocol data unit (PDU) session defines the association between the UE and the data network that provides a PDU connectivity service. The PDU session establishment is a parallel procedure of PDN connection (bearer) procedure in 4G/LTE. Each PDU session is identified by a PDU session ID (PSI), and may include multiple QoS flows and QoS rules. Each PDU session can be established via a 5G access network (e.g., 3GPP radio access network (RAN), or via a non-3GPP access). The network/UE can initiate different PDU session procedures, e.g., PDU session establishment, PDU session modification, and PDU session release, for managing PDU sessions.

Operators are seeking ways to balance data traffic between mobile networks and non-3GPP access in a way that is transparent to users and reduces mobile network congestion. In 5GS, UEs can be simultaneously connected to both 3GPP access and non-3GPP access (using NAS signalling), thus the 5GS is able to take advantage of these multiple accesses to improve the user experience and optimize the traffic distribution across various accesses. Accordingly, 3GPP introduced Multi-Access (MA) PDU session in 5GS. An MA PDU session can be configured to use one 3GPP access network or one non-3GPP access network at a time, or simultaneously one 3GPP access network and one non-3GPP access network.

The support for session and service continuity (SSC) in 5G System architecture enables to address the various continuity requirements of different applications/services for the UE. The SSC mode associated with a PDU Session does not change during the lifetime of a PDU Session. With SSC mode 3, changes to the user plane can be visible to the UE, while the network ensures that the UE suffers no loss of connectivity. A connection through new PDU Session Anchor point is established before the previous connection is terminated in order to allow for better service continuity. For the case of IPv4 or IPv6 or IPv4v6 type, the IP address is not preserved in this mode when the PDU Session Anchor changes. When UE receives a PDU SESSION MODIFICATION COMMAND message which includes 5GSM cause #39 "reactivation requested", UE handles the network-requested PDU session modification procedure, and UE re-initiates the UE-requested PDU session establishment procedure with a new PDU session ID. However, for MA PDU session, after UE handles the network-requested PDU session modification procedure (e.g., handles the PDU SESSION RELEASE MODIFICATION message), it is undefined how the UE should re-initiate the UE-requested PDU session establishment procedure.

A solution is sought.

SUMMARY

A method for handling a reactivation requested from the network for an MA PDU session with session and service continuity (SSC) mode 3 is proposed. The support for session and service continuity (SSC) in 5G System architecture enables to address the various continuity requirements of different applications/services for the UE. With SSC mode 3, changes to the user plane can be visible to the UE, while the network ensures that the UE suffers no loss of connectivity. A connection through new PDU Session Anchor point is established before the previous connection is terminated in order to allow for better service continuity. When UE receives a PDU SESSION MODIFICATION COMMAND message which includes 5GSM cause #39 "reactivation requested" for an existing MA PDU session, UE handles the network-requested PDU session modification procedure, and UE re-initiates the UE-requested PDU session establishment procedure with a new MA PDU session ID. UE determines how to proceed with a PDU session reestablishment procedure for the new MA PDU session based on different scenarios of UE registration and user plane resources of the existing MA PDU session, and/or also based on whether the PDU SESSION MODIFICATION COMMAND message is sent over 3GPP access type or non-3GPP access type.

In one embodiment, a UE maintains a first multi-access protocol data unit (MA PDU) session in a 5G system (5GS). The first MA PDU session has a first PDU session ID (PSI). The selected session and service continuity (SSC) mode of the first MA PDU session is SSC mode 3. The UE receives a PDU session modification command message for the first MA PDU session. The modification command message indicates reactivation requested and is received by the UE over a first access type. The UE transmits a PDU session modification complete message in response to the PDU session modification command message. The UE determines one or more access types based on UE registration, user plane resources of the first MA PDU session, and the first access type. The UE establishes a second MA PDU session having a second PSI. The UE initiates one or more PDU session establishment procedures over the determined one or more access types, respectively, for establishing the second MA PDU session.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7 is a flow chart of a method of handling MA PDU session modification procedure with reactivation requested in accordance with one novel aspect of the present invention.

DETAILED DESCRIPTION

Reference will now be made in detail to some embodiments of the invention, examples of which are illustrated in the accompanying drawings.

Figure 1:
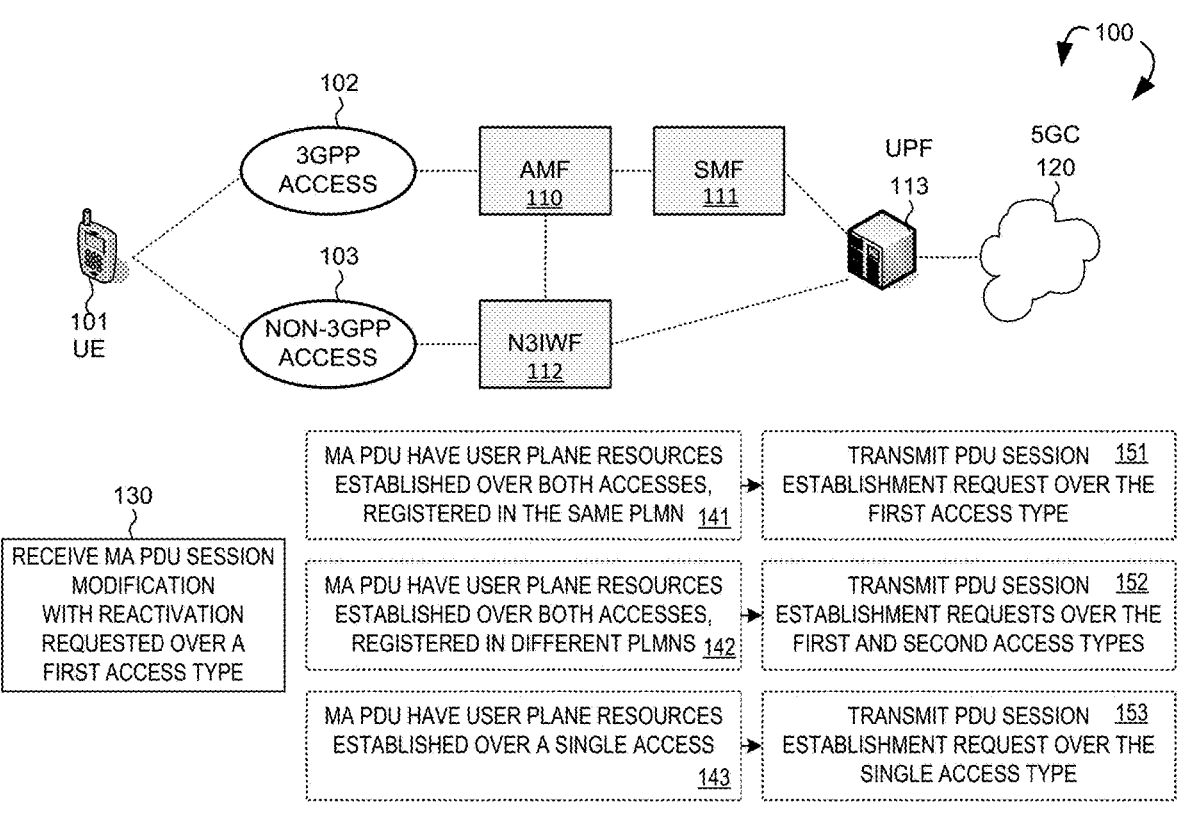
FIG. 1 illustrates an exemplary 5G network supporting multi-access (MA) protocol data unit (PDU) session management and a method for handling MA PDU session modification with reactivation requested in accordance with one novel aspect.

FIG. 1 illustrates an exemplary 5G network 100 supporting multi-access (MA) protocol data unit (PDU) session management and a method for handling MA PDU session modification with reactivation requested in accordance with one novel aspect. 5G new radio (NR) network 100 includes a user equipment (UE) 101, a 3GPP access 102 (e.g., a 3GPP radio access network (RAN)), a non-3GPP access 103 (e.g., a non-3GPP RAN), an access and mobility management function (AMF) 110, a session management function (SMF) 111, an Non-3GPP interworking function (N3IWF) 112, a user plane function (UPF) 113, and a 5G core (5GC) data network 120. The AMF 110 communicates with the base stations in the 3GPP access 102, the SMF 111, and the UPF 113 for access and mobility management of wireless access devices in the 5G network 100. The SMF 111 is primarily responsible for interacting with the decoupled data plane, creating, updating and removing PDU sessions and managing session context with the UPF 113. The N3IWF 112 interfaces to 5G core network control plane functions, responsible for routing messages outside 5G RAN.

In Access Stratum (AS) layer, an RAN provides radio access for the UE 101 via a radio access technology (RAT). In Non-Access Stratum (NAS) layer, the AMF 110 and the SMF 111 communicate with RAN and 5GC for access and mobility management and PDU session management of wireless access devices in the 5G network 100. The 3GPP access 102 may include base stations (gNBs or eNBs) providing radio access for the UE 101 via various 3GPP RATs including 5G, 4G, and 3G/2G. The non-3GPP access 103 may include access points (APs) providing radio access for the UE 101 via non-3GPP RAT including WiFi. The UE 101 can obtain access to data network 120 through 3GPP access 102, AMF 110, SMF 111, and UPF 113. The UE 101 can obtain access to data network 120 through non-3GPP access 103, N3IWF 112, AMF 110, SMF 111, and UPF 113. The UE 101 may be equipped with a single radio frequency (RF) module or transceiver or multiple RF modules or transceivers for services via different RATs/CNs. In some examples, UE 101 may be a smart phone, a wearable device, an Internet of Things (IoT) device, a tablet, etc.

In 5G, a PDU session defines the association between the UE and the data network that provides PDU connectivity service. Each PDU session is identified by a PDU session ID, and may include multiple QoS flows and QoS rules. Each PDU session can be established over a 3GPP RAN, or over a non-3GPP access. 5G session management (5GSM) for PDU sessions over both 3GPP access and non-3GPP access are managed by AMF and SMF via NAS signaling. In 5GS, UEs that can be simultaneously connected to both 3GPP access and non-3GPP access (using NAS signalling), thus the 5GS is able to take advantage of these multiple accesses to improve the user experience, and optimize the traffic distribution across various accesses. Accordingly, 3GPP introduced MA PDU sessions in 5GS. An MA PDU session uses one 3GPP access network or one non-3GPP access network at a time, or simultaneously one 3GPP access network and one non-3GPP access network.

The support for session and service continuity (SSC) in 5G System architecture enables to address the various continuity requirements of different applications/services for the UE. The SSC mode associated with a PDU Session does not change during the lifetime of a PDU Session. With SSC mode 3, changes to the user plane can be visible to the UE, while the network ensures that the UE suffers no loss of connectivity. A connection through new PDU Session Anchor point is established before the previous connection is terminated in order to allow for better service continuity. For the case of IPv4 or IPv6 or IPv4v6 type, the IP address is not preserved in this mode when the PDU Session Anchor changes. When UE receives a PDU SESSION MODIFICATION COMMAND message which includes 5GSM cause #39 "reactivation requested", UE handles the network-requested PDU session modification procedure, and UE re-initiates the UE-requested PDU session establishment procedure with a new PDU session ID. However, for MA PDU session, after the network-requested PDU session modification procedure, it is unclear how the UE should re-initiate the UE-requested PDU session establishment procedure.

In accordance with one novel aspect, upon UE 101 receives a PDU SESSION MODIFICATION COMMAND with "reactivation requested" (130) over a first access type, UE 101 determines how to proceed with a PDU session reestablishment procedure based on different scenarios. Under a first scenario (141), the MA PDU has user plane resources established over both 3GPP and non-3GPP, and UE 101 is registered over 3GPP and non-3GPP in the same PLMN, accordingly (151), UE 101 transmits a PDU SESSION ESTABLISHMENT REQUEST message over the first access type. In a second scenario (142), the MA PDU has user plane resources established over both 3GPP and non-3GPP, and UE 101 is registered over 3GPP and non-3GPP in different PLMNs, accordingly (152), UE 101 transmits a first PDU SESSION ESTABLISHMENT REQUEST message over the first access type, and a second SESSION ESTABLISHMENT REQUEST message over the second access type. In a third scenario (143), the MA PDU has user plane resources established over a single access type, accordingly (153), UE 101 transmits a PDU SESSION ESTABLISHMENT REQUEST message over the same single access type (which can the same or different from the first access type).

Figure 2:
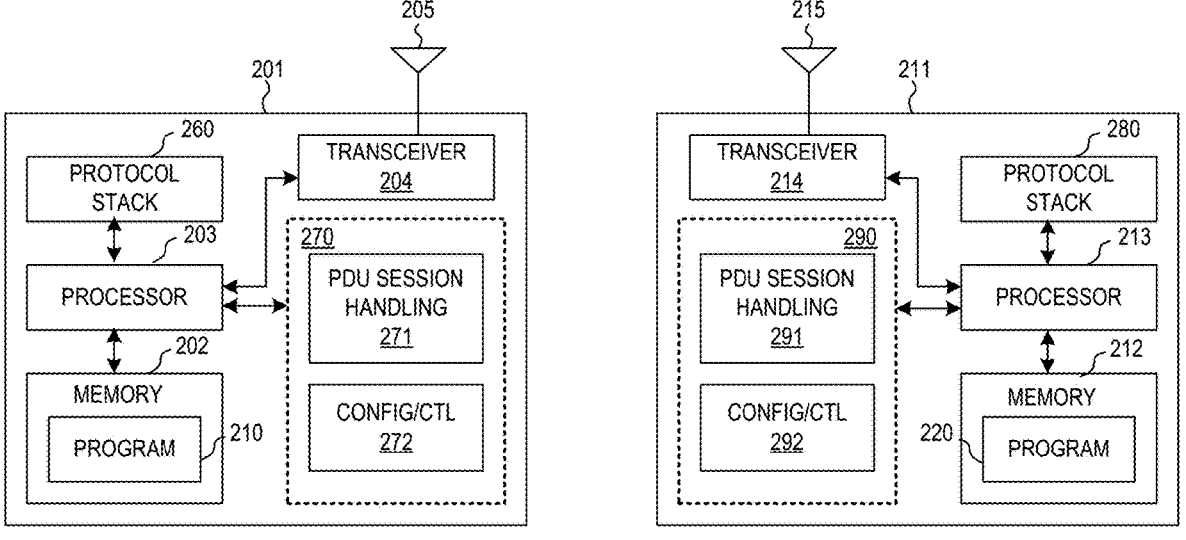
FIG. 2 illustrates simplified block diagrams of a user equipment (UE) and a network entity in accordance with embodiments of the current invention.

FIG. 2 illustrates simplified block diagrams of wireless devices, e.g., a UE 201 and a network entity 211 in accordance with embodiments of the current invention. Network entity 211 may be a base station and/or an AMF/SMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes protocol stack 280 and a set of control function modules and circuits 290. Protocol stacks 280 includes Non-Access-Stratum (NAS) layer to communicate with an AMF/SMF/MME entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. In one example, control function modules and circuits 290 includes PDU session handling circuit 291 that handles PDU establishment, modification, and release procedures, and configuration and control circuit 292 that provides different parameters to configure and control UE of related functionalities including mobility management and PDU session management.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also includes protocol stacks 260 and a set of control function modules and circuits 270. Protocol stacks 260 includes NAS layer to communicate with an AMF/SMF/MME entity connecting to the core network, RRC layer for high layer configuration and control, PDCP/RLC layer, MAC layer, and PHY layer. Control function modules and circuits 270 may be implemented and configured by software, firmware, hardware, and/or combination thereof. The control function modules and circuits, when executed by the processors via program instructions contained in the memory, interwork with each other to allow UE 201 to perform embodiments and functional tasks and features in the network.

In one example, control function modules and circuits 270 includes a PDU session handling circuit 271 that performs MA PDU session establishment, modification, and release procedures with the network, and a config and control circuit 272 that handles configuration and control parameters for mobility management and session management. When the UE receives a PDU SESSION MODIFICATION COMMAND with "reactivation requested" for an existing MA PDU, the UE completes the network-requested PDU session modification procedure, and also initiates a UE-requested PDU session establishment procedure(s) to establish a new MA PDU session for service continuity.

Figure 3:
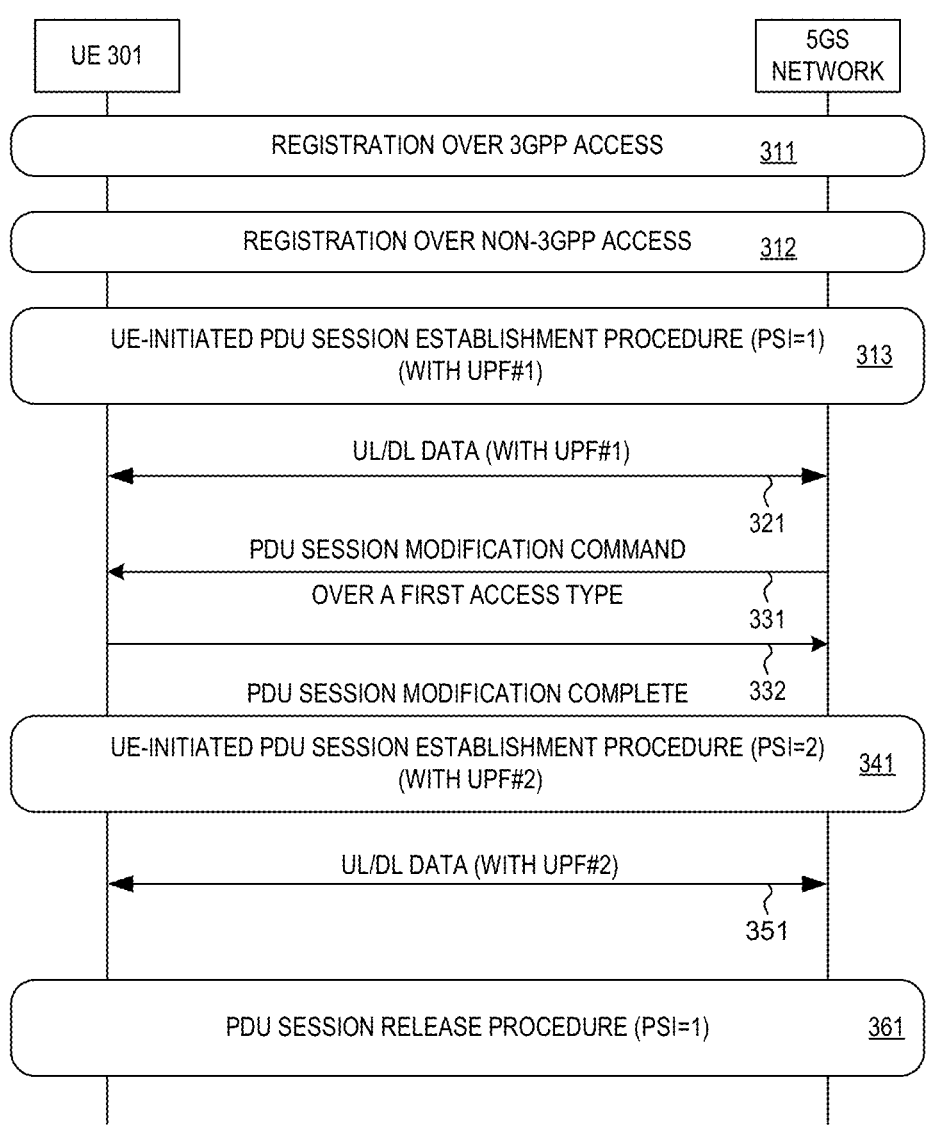
FIG. 3 is a sequence flow between a UE and 5GS for a MA PDU session modification procedure with reactivation requested in accordance with one novel aspect.

FIG. 3 is a sequence flow between a UE and 5GS for a MA PDU session modification procedure with reactivation requested in accordance with one novel aspect. In step 311, UE 301 registers with the 5GS network over 3GPP access type. In step 312, UE 301 registers with the 5GS network over non-3GPP access type. Note that UE 301 can be registered over 3GPP and non-3GPP in a same PLMN, or in two different PLMNs, respectively. In step 313, UE 301 initiates a UE-requested PDU session establishment procedure, and an MA PDU session with PSI=1 is established between UE 301 and the 5GS network (e.g., with UPF #1). The user plane resources of the MA PDU can be established on both 3GPP and non-3GPP accesses, or only on 3GPP access, or only on non-3GPP access. In step 321, UE 301 communicates uplink and downlink data through UPF #1, over 3GPP, or non-3GPP, or both access types.

The support for session and service continuity in 5G System architecture enables to address the various continuity requirements of different applications/services for the UE. The SSC mode associated with a PDU Session does not change during the lifetime of a PDU Session. With SSC mode 3, changes to the user plane can be visible to the UE, while the network ensures that the UE suffers no loss of connectivity. In step 331, UE 301 receives a PDU SESSION MODIFICATION COMMAND message from 5GS over a first access type, which includes 5GSM cause #39"reactivation requested". In step 332, UE 301 sends a PDU SESSION MODIFICATION COMPLETE message to 5GS.

In step 341, UE 301 initiates a UE-requested PDU session establishment procedure, to establish another MA PDU session with PSI=2 between UE 301 and the 5GS network (e.g., with UPF #2). The new MA PDU session having PSI=2 should be associated with the present MA PDU session having PSI=1, and should set the PDU session type, the session and service continuity (SSC) mode, the Data Network Name (DNN), and the Single-Network Slice Selection Assistance Information (S-NSSAI) to be the same as the present MA PDU session having PSI=1. In step 351, UE 301 communicates uplink and downlink data through UPF #2, over 3GPP, or non-3GPP, or both access types. In step 361, the present MA PDU session with PSI=1 is released. In one novel aspect, in step 341, UE 301 determines how to initiate the PDU session establishment procedure(s), e.g., over which access type(s) to transmit one or more corresponding PDU SESSION ESTABLISHMENT REQUEST message(s) based on 1) UE registration information, 2) the present MA PDU user plane resources, and/or 3) the first access type that the PDU SESSION MODIFICATION COMMAND message is received by the UE in step 331.

Figure 4:
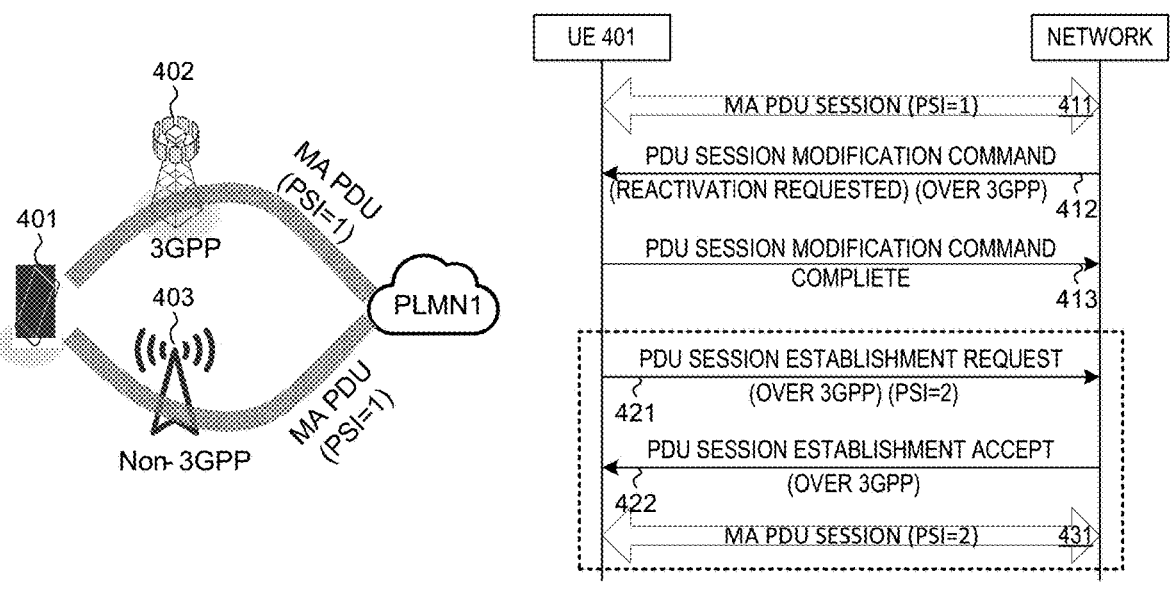
FIG. 4 illustrates a first embodiment of handling MA PDU session modification procedure with reactivation requested in accordance with one novel aspect.

FIG. 4 illustrates a first embodiment of handling MA PDU session modification procedure with reactivation requested in accordance with one novel aspect. In the embodiment of FIG. 4, in step 411, the MA PDU session (PSI=1) (and its user plane resources) is established over both 3GPP and non-3GPP accesses, and UE 401 is registered in the same PLMN1 over 3GPP and non-3GPP. In step 412, UE 401 receives a PDU SESSION MODIFICATION COMMAND message over a first access (e.g., 3GPP), with 5GSM cause #39 "reactivation requested". In step 413, UE 401 sends a PDU SESSION MODIFICATION COMPLETE message to the network. UE 401 then initiates a UE-requested PDU session establishment procedure, based on a determined access type, e.g., 3GPP. In step 421, UE 401 sends a PDU SESSION ESTABLISHMENT REQUEST message over 3GPP to the network, for establishing an MA PDU having PSI=2. In step 422, UE 401 receives a PDU SESSION ESTABLISHMENT ACCEPT message from the network. In step 431, a new MA PDU having PSI=2 is established, having the same parameters as the MA PDU having PSI=1, the MA PDU having PSI=1 is then released. Note that since UE 401 is registered in the same PLMN1 over 3GPP and non-3GPP, the new MA PDU session and user plane resources over both access types can be established in a single step.

Figure 5:
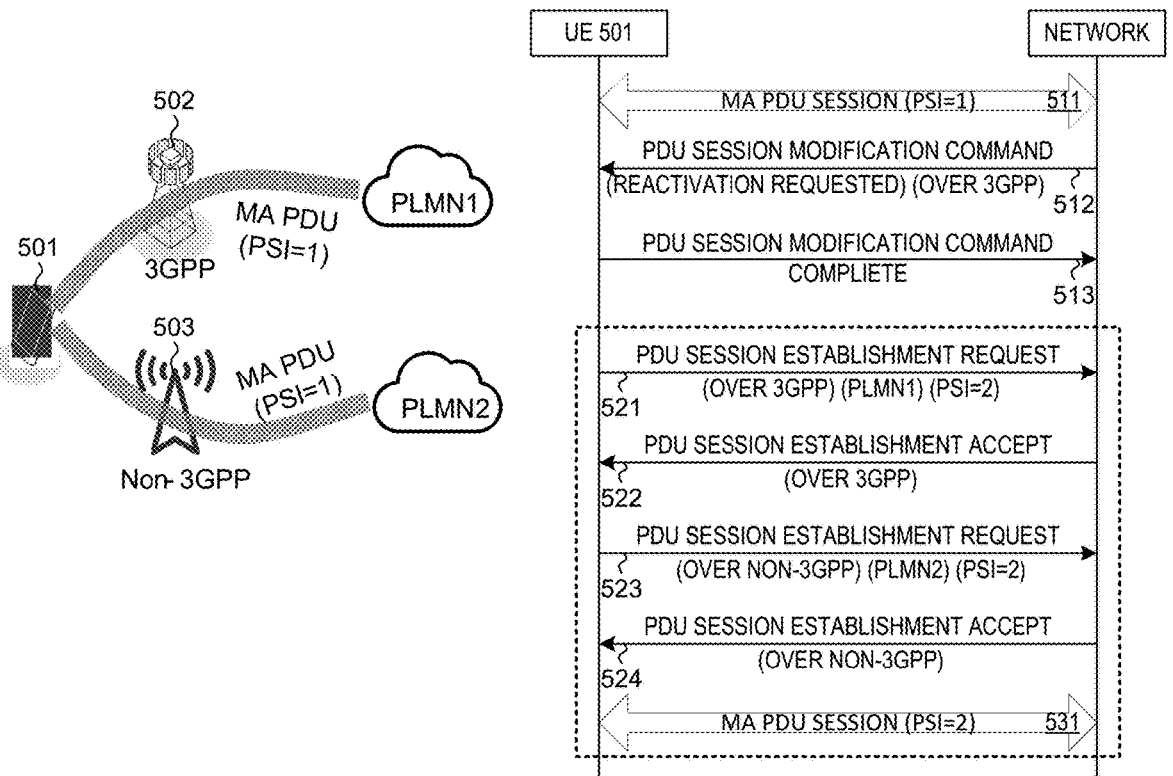
FIG. 5 illustrates a second embodiment of handling MA PDU session modification procedure with reactivation requested in accordance with one novel aspect.

FIG. 5 illustrates a second embodiment of handling MA PDU session modification procedure with reactivation requested in accordance with one novel aspect. In the embodiment of FIG. 5, in step 511, the MA PDU session (PSI=1) (and its user plane resources) is established over both 3GPP and non-3GPP accesses, and UE 501 is registered over 3GPP in PLMN1, and is registered over non-3GPP in PLMN2. In step 512, UE 501 receives a PDU SESSION MODIFICATION COMMAND message over a first access (e.g., 3GPP), with 5GSM cause #39 "reactivation requested". In step 513, UE 501 sends a PDU SESSION MODIFICATION COMPLETE message to the network. UE 501 then initiates a UE-requested PDU session establishment procedure, based on a determined access type, e.g., 3GPP. In step 521, UE 501 sends a first PDU SESSION ESTABLISHMENT REQUEST message over 3GPP to the network, for establishing an MA PDU having PSI=2 and user plane resources in PLMN1. In step 522, UE 401 receives a PDU SESSION ESTABLISHMENT ACCEPT message from the network. In step 523, UE 501 sends a second PDU SESSION ESTABLISHMENT REQUEST message over non-3GPP to the network, for establishing the MA PDU having PSI=2 and user plane resources in PLMN2. In step 524, UE 501 receives a PDU SESSION ESTABLISHMENT ACCEPT message from the network. In step 531, a new MA PDU having PSI=2 is established, having the same parameters as the MA PDU having PSI=1, the MA PDU having PSI=1 is then released.

Figure 6:
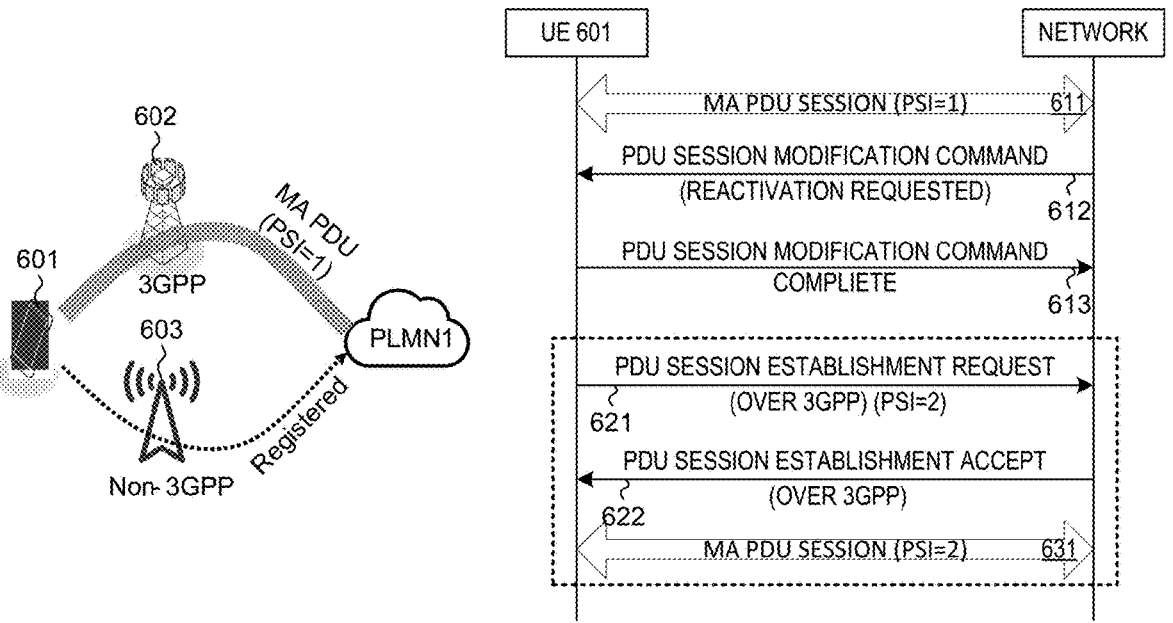
FIG. 6 illustrates a third embodiment of handling MA PDU session modification procedure with reactivation requested in accordance with one novel aspect.

FIG. 6 illustrates a third embodiment of handling MA PDU session modification procedure with reactivation requested in accordance with one novel aspect. In the embodiment of FIG. 6, in step 611, the MA PDU session (PSI=1) (and its user plane resources) is established over one access type only (e.g., 3GPP), and UE 601 is registered in PLMN1. In step 612, UE 601 receives a PDU SESSION MODIFICATION COMMAND message over an access type (e.g., 3GPP or non-3GPP), with 5GSM cause #39"reactivation requested". In step 613, UE 601 sends a PDU SESSION MODIFICATION COMPLETE message to the network. UE 601 then initiates a UE-requested PDU session establishment procedure over 3GPP only, based on the fact the user plane resources of the present MA PDU session is established over 3GPP access only. In step 621, UE 601 sends a PDU SESSION ESTABLISHMENT REQUEST message over 3GPP to the network, for establishing a new MA PDU having PSI=2 and user plane resources over 3GPP only. In step 622, UE 601 receives a PDU SESSION ESTABLISHMENT ACCEPT message from the network. In step 631, a new MA PDU having PSI=2 is established, having the same parameters as the MA PDU having PSI=1, the MA PDU having PSI=1 is then released.

FIG. 7 is a flow chart of a method of handling MA PDU session modification procedure with reactivation requested in accordance with one novel aspect of the present invention. In step 701, a UE maintains a first multi-access protocol data unit (MA PDU) session in a 5G system (5GS). The first MA PDU session has a first PDU session ID (PSI). The selected session and service continuity (SSC) mode of the first MA PDU session is SSC mode 3. In step 702, the UE receives a PDU session modification command message for the first MA PDU session. The modification command message indicates reactivation requested and is received by the UE over a first access type. In step 703, the UE transmits a PDU session modification complete message in response to the PDU session modification command message. In step 704, the UE determines one or more access types based on UE registration, user plane resources of the first MA PDU session, and the first access type. In step 705, the UE establishes a second MA PDU session having a second PSI. The UE initiates one or more PDU session establishment procedures over the determined one or more access types, respectively, for establishing the second MA PDU session.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:

maintaining a first multi-access protocol data unit (MA PDU) session by a user equipment (UE) in a 5G system (5GS), wherein the first MA PDU session has a first PDU session ID (PSI) and is associated with Session and Service Continuity (SSC) mode 3;

receiving a PDU session modification command message for the first MA PDU session, wherein the PDU session modification command message indicates reactivation requested and is received by the UE over a first access type;

transmitting a PDU session modification complete message in response to the PDU session modification command message;

determining one or more access types for a second MA PDU session based on UE registration of the first MA PDU session of the UE, user plane resources of the first MA PDU session, and the first access type, wherein the UE is registered with a same Public Land Mobile Network (PLMN) or with different PLMN; and establishing the second MA PDU session having a second PSI, wherein the UE initiates one or more PDU session establishment procedures over the determined one or more access types, respectively, for establishing the second MA PDU session.

2. The method of claim 1, wherein the second MA PDU session is associated with the first MA PDU session and having a PDU session type, a session and service continuity (SSC) mode, a Data Network Name (DNN), and Single-Network Slice Selection Assistance Information (S-NSSAI) that are the same as the first MA PDU session.

3. The method of claim 2, wherein the UE releases the first MA PDU session upon establishment of the second MA PDU session and maintains session and service continuity.

4. The method of claim 1, wherein the user plane resources of the first MA PDU session are established over both a 3GPP and a non-3GPP access types.

5. The method of claim 4, wherein the UE is registered with a single PLMN over both the 3GPP and the non-3GPP access types, wherein the determined one or more access types is the first access type, and wherein the UE initiates a single PDU session establishment procedure over the first access type.

6. The method of claim 4, wherein the UE is registered with a first PLMN over the first access type, and is registered with a second PLMN over a second access type, wherein the determined one or more access types are the first access type and the second access type, and wherein the UE initiates a first establishment procedure over the first access type and a second establishment procedure over the second access type.

7. The method of claim 6, wherein the UE initiates the first establishment procedure over the first access type before the UE initiates the second establishment procedure over the second access type.

8. The method of claim 1, wherein the user plane resources of the MA PDU are established over a single access type.

9. The method of claim 8, wherein the determined one or more access types is the single access type, and wherein the UE initiates a single PDU session establishment procedure over the single access type.

10. The method of claim 8, wherein the single access type is either the same as or different from the first access type.

11. A User Equipment (UE), comprising:
a protocol data unit (PDU) session handling circuit that maintains a first multi-access PDU (MA PDU) session in a 5G system (5GS), wherein the first MA PDU session has a first PDU session ID (PSI) and is associated with Session and Service Continuity (SSC) mode 3;
a receiver that receives a PDU session modification command message for the first MA PDU session, wherein the PDU session modification command message indicates reactivation requested and is received by the UE over a first access type;
a transmitter that transmits a PDU session modification complete message in response to the PDU session modification command message; and
a control circuit that determines one or more access types for a second MA PDU session based on UE registration of the first MA PDU session of the UE, user plane resources of the first MA PDU session, and the first access type, wherein the UE is registered with a same Public Land Mobile Network (PLMN) or with different PLMN, wherein the PDU session handling circuit that establishes the second MA PDU session having a second PSI, wherein the UE initiates one or more PDU session establishment procedures over the one or more access types, respectively, for establishing the second MA PDU session.

12. The UE of claim 11, wherein the second MA PDU session is associated with the first MA PDU session and having a PDU session type, a session and service continuity (SSC) mode, a Data Network Name (DNN), and Single-Network Slice Selection Assistance Information (S-NSSAI) that are the same as the first MA PDU session.

13. The UE of claim 12, wherein the UE releases the first MA PDU session upon establishment of the second MA PDU session and maintains service continuity.

14. The UE of claim 11, wherein the user plane resources of the first MA PDU session are established over both a 3GPP and a non-3GPP access types.

15. The UE of claim 14, wherein the UE is registered with a single PLMN over both the 3GPP and the non-3GPP access types, wherein the determined one or more access types is the first access type, and wherein the UE initiates a single PDU session establishment procedure over the first access type.

16. The UE of claim 14, wherein the UE is registered with a first PLMN over the first access type, and is registered with a second PLMN over a second access type, wherein the determined one or more access types are the first access type and the second access type, and wherein the UE initiates a first establishment procedure over the first access type and a second establishment procedure over the second access type.

17. The UE of claim 16, wherein the UE initiates the first establishment procedure over the first access type before the UE initiates the second establishment procedure over the second access type.

18. The UE of claim 11, wherein the user plane resources of the MA PDU are established over a single access type.

19. The UE of claim 18, wherein the determined one or more access types is the single access type, and wherein the UE initiates a single PDU session establishment procedure over the single access type.

20. The UE of claim 18, wherein the single access type is either the same as or different from the first access type.

* * * * *